(12) United States Patent
Motegi et al.

(10) Patent No.: US 8,208,923 B2
(45) Date of Patent: Jun. 26, 2012

(54) MOBILE COMMUNICATION METHOD, RADIO BASE STATION AND UPPER NODE

(75) Inventors: Masayuki Motegi, Yokohama (JP); Wuri Andarmawanti Hapsari, Yokosuka (JP); Yoshitsugu Shimazu, Kawasaki (JP); Yasuhiro Kato, Yokohama (JP); Takehiro Nakamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 286 days.

(21) Appl. No.: 12/530,577

(22) PCT Filed: Mar. 7, 2008

(86) PCT No.: PCT/JP2008/054127
§ 371 (c)(1),
(2), (4) Date: Nov. 5, 2009

(87) PCT Pub. No.: WO2008/111502
PCT Pub. Date: Sep. 18, 2008

(65) Prior Publication Data
US 2010/0113022 A1 May 6, 2010

(30) Foreign Application Priority Data

Mar. 9, 2007 (JP) ................................ P2007-061090

(51) Int. Cl.
*H04Q 7/20* (2006.01)

(52) U.S. Cl. ......... 455/436; 370/331; 370/332; 370/338
(58) Field of Classification Search .................. 370/332; 455/436
See application file for complete search history.

(56) References Cited

U.S. PATENT DOCUMENTS

| 7,738,871 | B2 * | 6/2010 | Olvera-Hernandez et al. | 455/436 |
| 2006/0140150 | A1 * | 6/2006 | Olvera-Hernandez et al. | 370/331 |
| 2006/0198345 | A1 * | 9/2006 | Chen | 370/338 |
| 2007/0243872 | A1 * | 10/2007 | Gallagher et al. | 455/436 |

(Continued)

FOREIGN PATENT DOCUMENTS

| WO | 2006/063330 A2 | 6/2006 |
| WO | 2007/125593 A1 | 11/2007 |

OTHER PUBLICATIONS

Ericsson, "Updates to Intra-LTE handover in 36.300," 3GPP TSG-RAN WG3 #54, T-doc R3-061788; Riga, Latvia; Nov. 6-10, 2006; 4 pages.

(Continued)

*Primary Examiner* — Charles Shedrick
(74) *Attorney, Agent, or Firm* — Osha Liang LLP

(57) ABSTRACT

An upper node and a handover source radio base station store setup information on an access bearer having been set up between the upper node and the handover source radio base station. A mobile communication method according to the present invention includes the steps of: (A) informing, from the handover source radio base station to a handover target radio base station, the access bearer setup information; (B) storing, at the handover target radio base station, the access bearer setup information informed of by the handover target radio base station; and (C) setting up, at the upper node, an access bearer between the upper node and the handover target radio base station by using the stored access bearer setup information without performing reallocation processing of new access bearer setup information, the access bearer being set up in response to a path switching request from the handover target radio base station.

8 Claims, 7 Drawing Sheets

U.S. PATENT DOCUMENTS

2008/0025263 A1* 1/2008 Pelkonen .................. 370/332
2010/0113022 A1* 5/2010 Motegi et al. ............... 455/436
2011/0195716 A1* 8/2011 Hapsari et al. ............. 455/436

OTHER PUBLICATIONS

3GPP TS 25.413 V6.12.0, Dec. 2006, "Technical Specification Group Radio Access Network; UTRAN Iu interface RANAP signalling," 336 pages.

International Search Report issued in PCT/JP2008/054127, mailed on Jun. 24, 2008, w/translation, 3 pages.
Written Opinion issued in PCT/JP2008/054127, mailed on Jun. 24, 2008, 3 pages.
Official Action Letter for Indonesian Application No. W00 2009 02464, mailed on Jul. 25, 2011 and English translation thereof (4 pages).
Singaporean Office Action for Application No. 2009059585, mailed on Sep. 16, 2010 (9 pages).

* cited by examiner

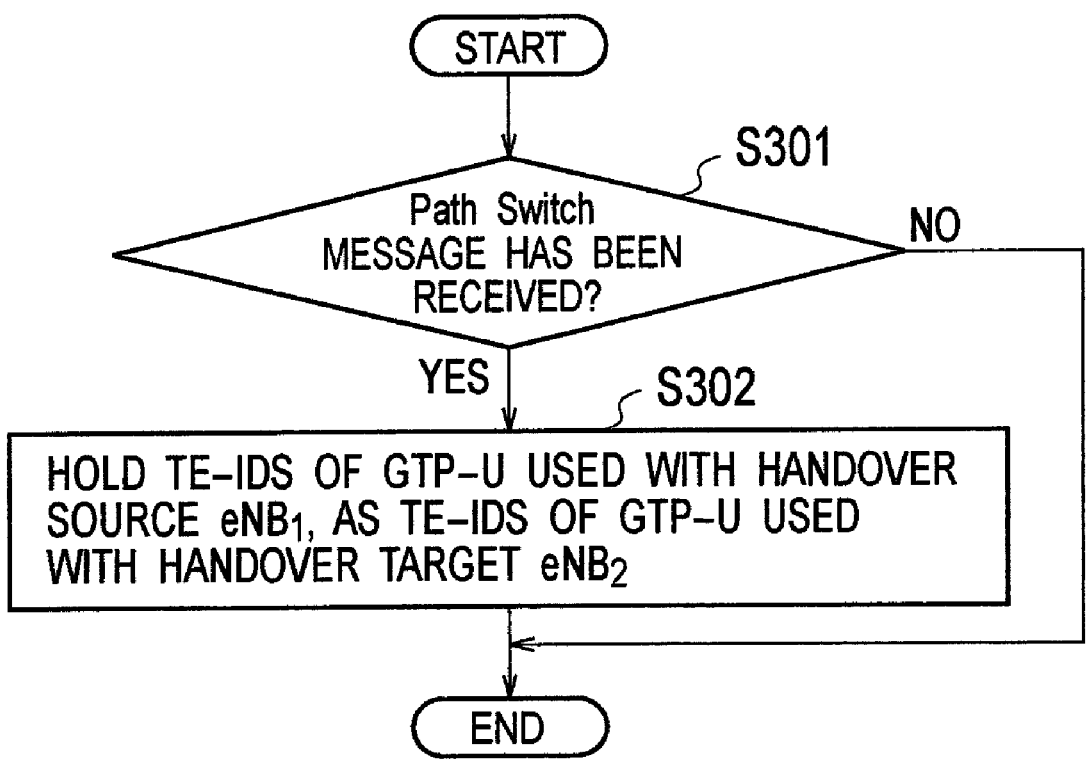

MOBILE COMMUNICATION METHOD, RADIO BASE STATION AND UPPER NODE

TECHNICAL FIELD

The present invention relates to a mobile communication method for performing handover of a mobile station from a handover source radio base station to a handover target radio base station in a mobile communication system including multiple radio base stations and an upper node of the multiple radio base stations.

Additionally, the present invention relates to a radio base station and an upper node used in the above mobile communication method.

BACKGROUND ART

In an IMT-2000 (International Mobile Telecommunication-2000) system, as shown in FIG. 1, an Iu interface is defined between a RAN (Radio Access Network) node (for example, RNC: Radio Network Controller) and a core node (for example, SGSN: Serving GPRS Service Node), and a GTP (GPRS Tunneling Protocol) tunnel used for transmitting user plane (U-plane) data is set up in the Iu interface.

In the above IMT-2000 system, when a mobile station performs handover across RNCs which are under the control of the same SGSN, that is, when the mobile station performs "SGSN relocation", the SGSN transmits a "Relocation Request message" by using RANAP (Radio Access Network Application Part), and a GTP tunnel endpoint ID on the SGSN side is reset.

That is, the SGN informs the RNC #2 of a GTP tunnel endpoint ID on the NodeB side by using the "Relocation Request message", and thereby a GTP tunnel #2 is set up between the SGSN and a handover target RNC #2.

Non-patent Document 1: 3GPP TS25.413

DISCLOSURE OF THE INVENTION

In a next-generation mobile communication system (for example, LTE: Long Term Evolution) following INT-2000 systems, an S1 interface corresponding to an Iu interface is defined. Also in the S1 interface, a GTP tunnel is set up between a RAN node (for example, a radio base station eNB) and a core node (for example, SAE (System Architecture Evolution) Gateway).

In the above mobile communication system, in handover, an "SAE Access Bearer" corresponding to an "SAE Access Bearer" having been set up between a handover source radio base station eNB and the core node SAE Gateway needs to be set up between a handover target radio base station eNB and the core node SAE Gateway.

Usually, the core node SAE Gateway starts the above setting up of the "SAE Access Bearer".

In the LTE system, however, handover is performed as follows. Specifically, as shown in FIG. 2, a handover target radio base station eNB$_2$ transmits a "Handover Complete message" in step S2007. Then in step S2008, a core node SAE Gateway performs processing for reallocation of a TE (Tunnel Endpoint)-ID on the core node side in the GTP tunnel to be set up between the core node and the handover target radio base station eNB$_2$. Accordingly, the LTE system has a problem of delay in handover.

The present invention has been made in consideration of the above described problem, and an object of the present invention is to provide a mobile communication method, a radio base station and an upper node which are capable of reducing a delay in the handover by allowing a handover target radio base station eNB to use a UE Context held by a handover source radio base station eNB, in handover.

A first aspect of the present invention is summarized as a mobile communication method for performing handover of a mobile station from a radio base station to another radio base station different from the radio base station in a mobile communication system including a plurality of radio base stations and an upper node of the plurality of radio base stations, in which the upper node and a handover source radio base station store setup information on an access bearer having been set up between the upper node and the handover source radio base station, the mobile communication method including the steps of: (A) informing, from the handover source radio base station to a handover target radio base station, the access bearer setup information; (B) storing, at the handover target radio base station, the access bearer setup information informed of by the handover target radio base station; and (C) setting up, at the upper node, an access bearer between the upper node and the handover target radio base station by using the stored access bearer setup information without performing reallocation processing of new access bearer setup information, the access bearer being set up in response to a path switching request from the handover target radio base station.

In the first aspect, each of the access bearers can be a tunnel used for transmitting user data, and the access bearer set up information can be a TE-ID of GTP-U on the upper node side in the tunnel.

In the first aspect, in the step (A), the handover source radio base station can inform the handover target radio base station of an IP address for the upper node in addition to the access bearer setup information.

In the first aspect, in the step (A), the handover source radio base station can transmit the access bearer setup information to the handover target radio base station by having the access bearer setup information contained in a message requesting the handover target radio base station to perform the handover.

In the first aspect, in the step (B), the handover target radio base station can select access bearer setup information that can be handed over to the handover target radio base station, from the access bearer setup information informed of by the handover target radio base station, and stores the access bearer setup information thus selected.

A second aspect of the present invention is summarized as a radio base station used in a mobile communication system in which handover of a mobile station can be performed, the radio base station including: a handover controller unit configured to transmit a message to a handover target radio base station when a predetermined condition is satisfied with respect to a communication quality in the mobile station, the message requesting the handover target radio base station to perform the handover, wherein the handover controller unit is configured to transmit a TE-ID of GTP-U on the upper node side in a tunnel by having the TE-ID contained in the message, the tunnel having been set up between the radio base station and an upper node of the radio base station and being used for transmitting user data.

A second aspect of the present invention is summarized as a radio base station used in a mobile communication system in which handover of a mobile station can be performed, the radio base station including: a handover controller unit configured to set up a tunnel for transmitting user data, between the radio base station and an upper node of the radio base station when having received a message from a handover source radio base station, the message requesting the radio base station to perform the handover, wherein the handover controller unit is configured to set up the tunnel between the radio base station and the upper node by using a TE-ID of GTP-U on the upper node side in a tunnel set up between the handover source radio base station and the upper node, the TE-ID being contained in the message.

A third aspect of the present invention is summarized as an upper node of a plurality of radio base stations used in a mobile communication system in which handover of a mobile station can be performed, wherein the upper node is configured to store setup information on an access bearer having been set up between the upper node and a handover source radio base station, and in response to a path switching request from a handover target radio base station, the upper node is configured to set up an access bearer between the upper node and the handover target radio base station by using the stored access bearer setup information, without performing reallocation processing of new access bearer setup information.

As described above, the present invention can provide a mobile communication method, a radio base station and an upper node which are capable of reducing a delay in the handover by allowing a handover target radio base station eNB to use a UE Context held by a handover source radio base station eNB, in handover.

BRIEF DESCRIPTION OF THE DRAWINGS

FIG. 9 is a flowchart showing an operation of the SAE Gateway according to the first embodiment of the present invention.

BEST MODE FOR CARRYING OUT THE INVENTION (Configuration of Mobile Communication System According to First Embodiment of the Present Invention)

A first embodiment of the present invention will be described with reference to FIGS. 3 to 5.

A mobile communication system according to this embodiment is operable to implement a communication technology used during handover, in particular, operable to implement a communication technology of an access bearer which is set up between a radio base station (hereinafter, eNB) and an upper node (hereinafter, SAE Gateway).

Figure 1:
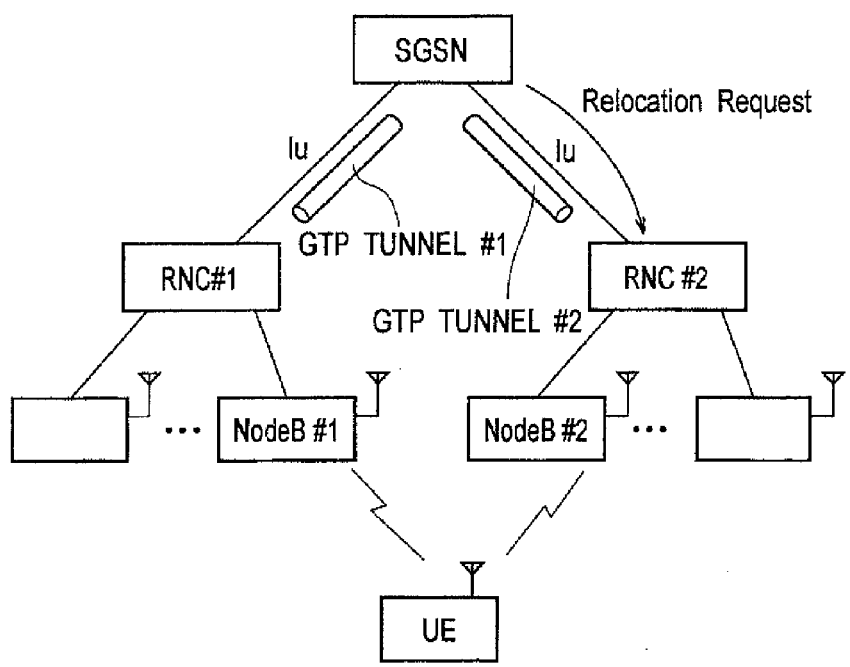
FIG. 1 is an entire configuration diagram of an IMT 2000 system.
Figure 2:
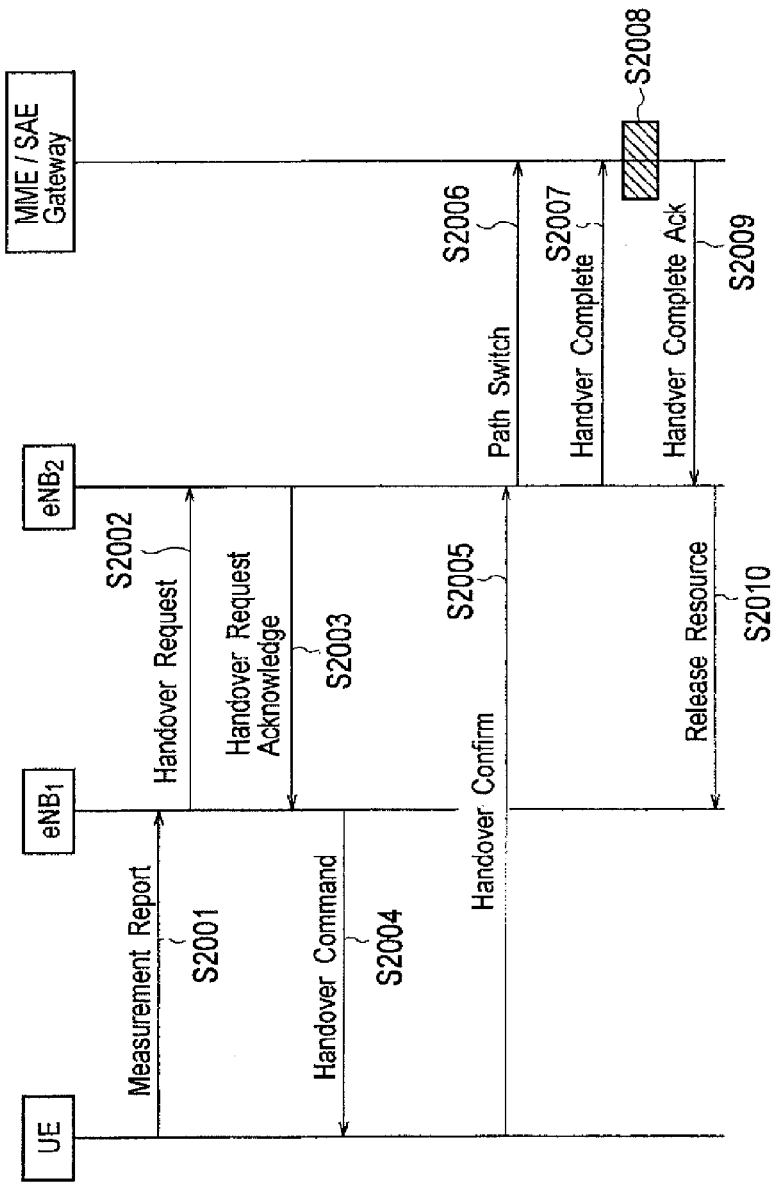
FIG. 2 is a sequence diagram showing handover operations in a conventional next-generation mobile communication system.
Figure 3:
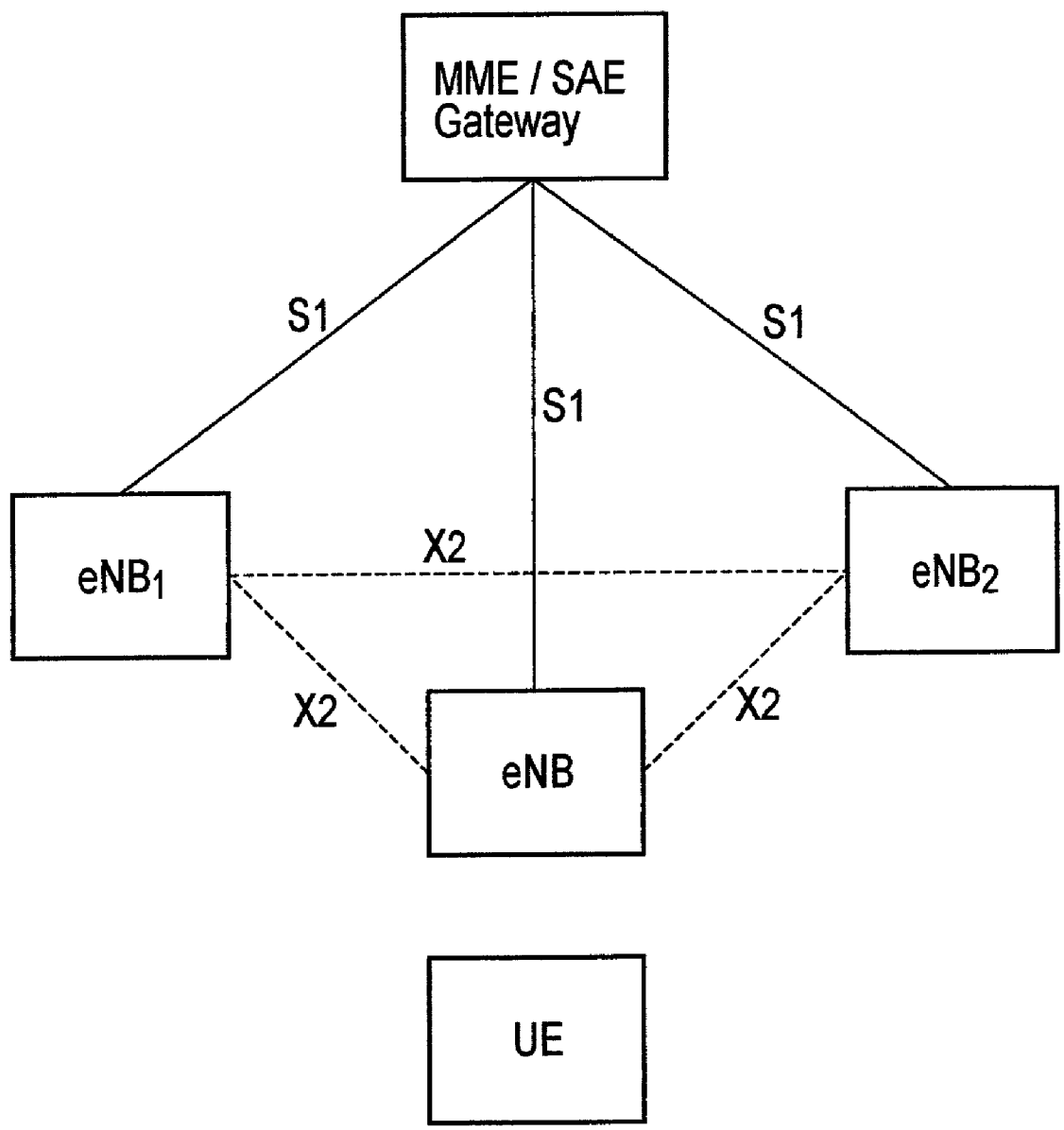
FIG. 3 is an entire configuration diagram of a mobile communication system according to a first embodiment of the present invention.

In this embodiment, description will be given by taking as an example a mobile communication system including, as shown in FIG. 3, an LTE/SAE architecture of which standardization has been ongoing in the 3GPP. However, the present invention is not limited to the above mobile communication system, and is applicable to a mobile communication system including another architecture.

A radio access network is composed of multiple eNBs and a core node MME/SAE Gateway to which the eNBs are connected.

Here, an MME is a node that handles control data, and an SAE Gateway is a node that handles user data.

Note that, while the eNBs are connected to one another via interfaces called X2 interfaces, each eNB and the MME/SAE Gateway is connected to each other via an interface called an S1 interface.

Control plane (C-plane) data (control data) and user plane (U-plane) data (user data) are transmittable either on an X2 interface or on an S1 interface.

In particular, user plane data is transmitted through GTP-U/UDP, and a GTP tunnel used for transmitting user plane data is set up between an eNB and the SAE Gateway by having TE-IDs exchanged therebetween.

Figure 4:
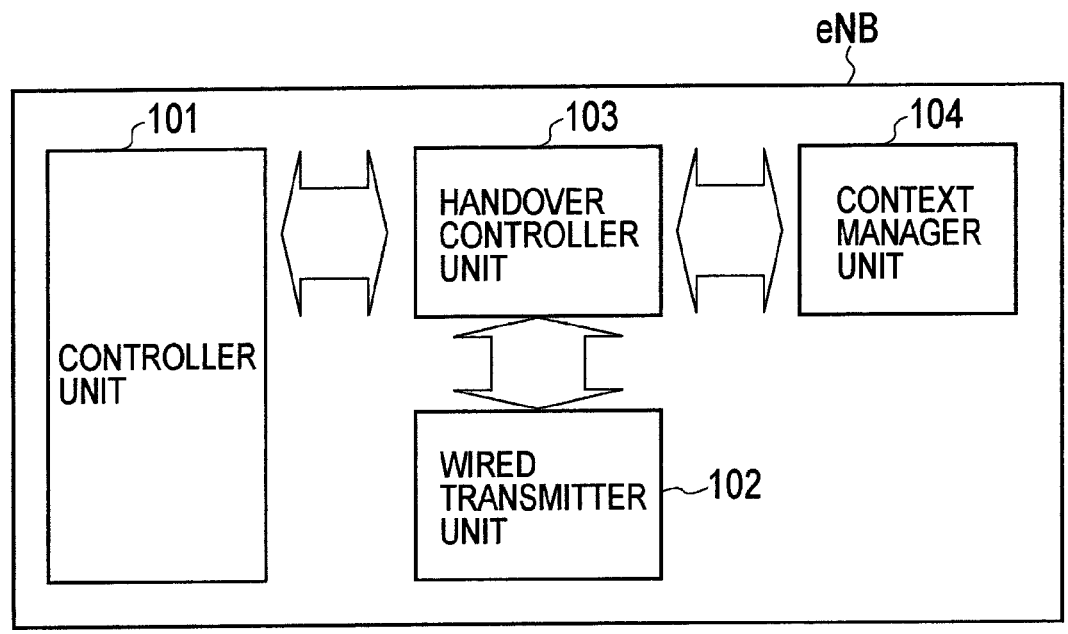
FIG. 4 is a functional block diagram of an eNB according to the first embodiment of the present invention.

As shown in FIG. 4, each of the eNBs according to this embodiment includes a controller unit 101, a wired transmitter unit 102, a handover controller unit 103 and a context manager unit 104.

The controller unit 101 is configured to control operations of the respective function units 102 to 104.

The wired transmitter unit 102 is configured to transmit and receive control data and user data through a wired transmission path.

The context manager unit 104 is configured to hold a UE Context containing a TE-ID of GTP-U (access bearer setup information) for identifying each service of each mobile station (hereinafter, UE) on an "SAE Access Bearer" (an access bearer) set up between the eNB and the SAE Gateway.

The handover controller unit 103 is configured to perform signaling during handover.

For example, the handover controller unit 103 in a handover source $eNB_1$ is configured to inform a handover target $eNB_2$ of a UE Context (containing access bearer setup information such as a TE-ID of GTP-U on the SAE gateway side in a GTP tunnel) of a handover subject.

Specifically, the above handover controller unit 103 is configured to transmit a "Handover Request message" when having judged based on a "Measurement Report message" transmitted from the UE that a communication quality in the UE satisfies a predetermined condition, the "Handover Request message" requesting the handover target $eNB_2$ to perform the handover.

Additionally, the handover controller unit 103 may be configured to transmit a TE-ID on the SAE Gateway side in a GTP tunnel by having the TE-ID, as the above described access bearer setup information, contained in the "Handover Request message", the GTP tunnel having been set up between the eNB and the SAE Gateway which is an upper node of the eNB.

Additionally, the handover controller unit 103 may be configured to inform the handover target $eNB_2$ of an IP address for the SAE Gateway (an address for the upper node) in addition to the above described access bearer setup information.

The handover controller unit 103 in the handover target $eNB_2$ is configured to set up a GTP tunnel between the handover target $eNB_2$ and the SAE gateway, when having received a message, from the handover source $eNB_1$, requesting the handover target $eNB_2$ to perform the handover.

Specifically, the above handover controller unit 103 is configured to set up the GTP tunnel between the handover target $eNB_2$ and the SAE gateway by using the TE-ID, which is contained in the "Handover Request message", on the SAE Gateway side in the GTP tunnel having been set up between the handover source eNB$_1$ and the SAE Gateway.

Here, the above handover controller unit 103 is configured to perform reallocation processing with respect to a TE-ID on the handover target eNB$_2$ side in the above GTP tunnel.

Note that, since TE-IDs can be independently allocated to the respective eNBs, the above handover controller unit 103 is configured to allocate the same TE-ID as the TE-ID informed of by the handover source eNB$_1$, as the TE-ID on the handover target eNB$_2$ side in the above GTP tunnel.

Additionally, the above handover controller unit 103 is configured to inform the SAE Gateway of the allocated TE-ID (access bearer setup information) on the handover target eNB$_2$ side and of an IP address for the handover target eNB$_2$ by using a "Handover Complete message".

Additionally, the handover controller unit 103 in the handover target eNB$_2$ may be configured select access bearer setup information (a TE-ID on the eNB$_2$ side) that can be handed over to the handover target eNB$_2$, from access bearer setup information (TE-IDs on the eNB$_2$ side) informed of by the handover source eNB$_1$, and to store therein the access bearer setup information thus selected.

Table 1 shows one example of the "Handover Request message" used in this embodiment.

without performing reallocation processing of new access bearer setup information (a TE-ID on the SAE Gateway side), in response to a "Path Switch message (path switching request)" from the handover target eNB$_2$.

Specifically, the context manager unit 203 is configured to store therein access bearer setup information (the TE-ID on the eNB$_2$ side) informed of by the handover target eNB$_2$ by using the "Handover Complete message", and to setup an access bearer (a GTP tunnel) between the SAE Gateway and the handover target eNB$_2$ by using the stored access bearer setup information.

(Operations of Mobile Communication System According to First Embodiment of the Present Invention)

Operations of the mobile communication system according to the first embodiment of the present invention will be described with reference to FIGS. 6 to 9.

Firstly, handover operations in the mobile communication system according to the first embodiment of the present invention will be described with reference to FIG. 6.

Figure 6:
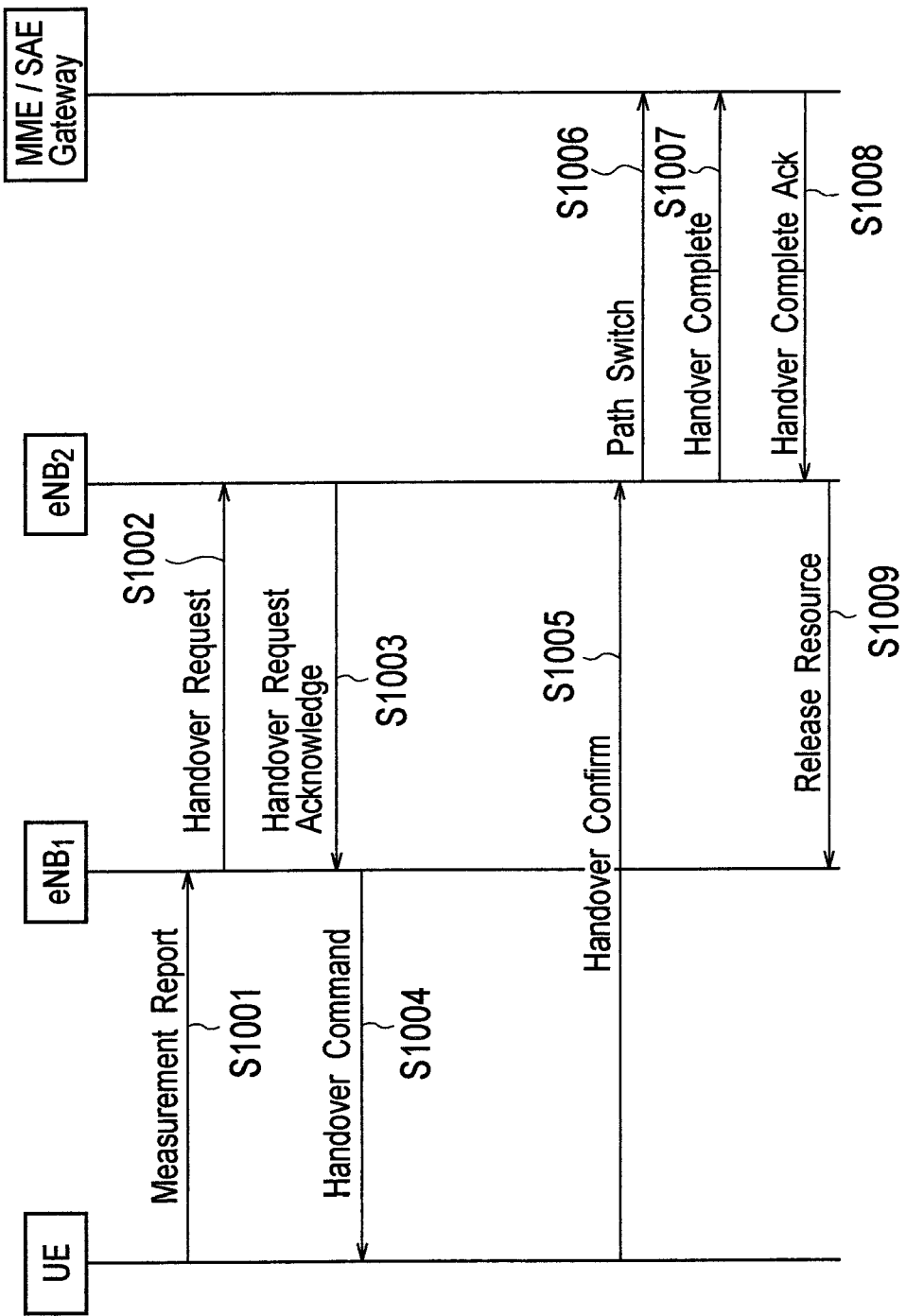
FIG. 6 is a sequence diagram showing handover operations in the mobile communication system according to the first embodiment of the present invention.

As shown in FIG. 6, in step S1001, a UE monitors communication qualities in the UE in accordance with an instruction from the eNB$_1$ or autonomously, and transmits "Measurement Report" to a cell (the eNB$_1$) to which the UE is

TABLE 1

| Information element | Need | Type and reference | Semantics description |
| --- | --- | --- | --- |
| Message type | MP | Message type | |
| eNB communication context id | MP | Bit string (24) | For source eNB |
| MME communication context id | MP | Bit string (24) | |
| Transparent container | MP | Transparent container | |
| SAE bearer IEs | | | |
| >SAE bearer setup list | MP | | |
| >>SAE Bearer id | MP | Bit string (8) | |
| >>SAE Bearer parameters | MP | SAE bearer parameters | |
| Transport layer IEs | | | |
| >>S1 transport association | MP | Octet string (4) | TE-ID for SAE Gateway |
| >>Transport layer association | MP | Octet string (4) | IP address for SAE Gateway |
| UP tunnel IEs | | | |
| >>X2 transport association | MP | Octet string (4) | TE-ID for source eNB |
| >>Transport layer address | MP | Octet string (4) | IP address for source eNB |

The above "Handover Request message" contains UE Contexts held by the handover source eNB$_1$. The UE Contexts are such as, for example, a list of SAE Access Bearers having been set up by the handover source eNB$_1$, TE-IDs on the SAE Gateway side in the respective SAE Access Bearers, and an IP address for the SAE Gateway.

The above "Handover Request message" may contain, other than the above information, another UE Context required by the handover target eNB$_2$.

Figure 5:
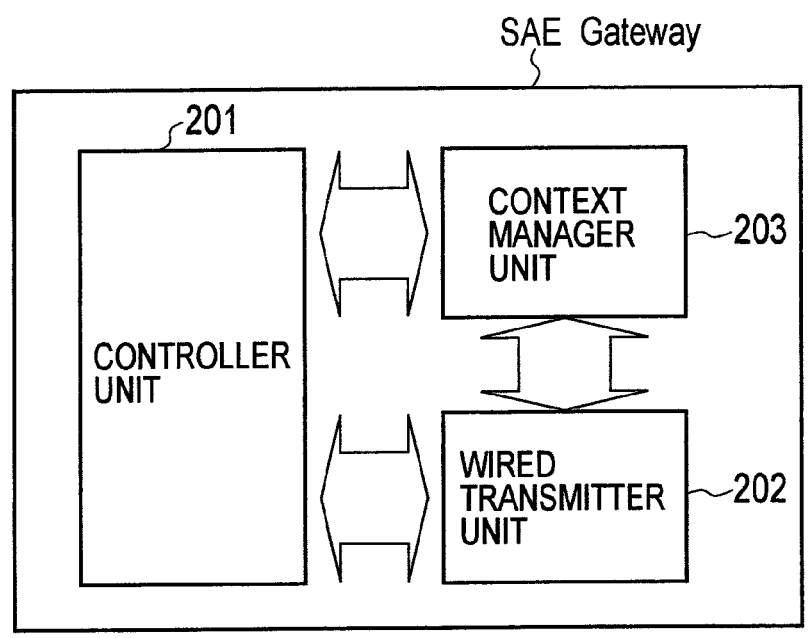
FIG. 5 is a functional block diagram of an SAE Gateway according to the first embodiment of the present invention.

As shown in FIG. 5, the SAE Gateway according to this embodiment includes a controller unit 201, a wired transmitter unit 202 and a context manager unit 203.

The controller unit 201 is configured to control operations of the respective function units 202 and 203. The wired transmitter unit 202 is configured to transmit and receive control data and user data through a wired transmission path.

The context manager unit 203 is configured to hold contexts by which user data of the respective UEs are identified, and to reset contexts in the handover target eNB$_2$ to the same contexts as the above after a path switch (path switching).

That is, the context manager unit 203 is configured to hand over a TE-ID on the SAE Gateway side in the GTP tunnel between the handover source eNB$_1$ and the SAE gateway connected, when a communication quality of the cell (the eNB$_1$) being connected thereto has decreased to a level lower than a predetermined quality.

In step S1002, the eNB$_1$ having received "Measurement Report" transmits a "Handover Request message" to, for example, the eNB$_2$ having the highest communication quality among communication qualities reported from the UE.

Here, the "Handover Request message" contains: a TE-ID on the SAE Gateway side in the SAE Access Bearers having been set up between the handover source eNB$_1$ and the SAE Gateway; and an address (for example, an IP address) for the SAE Gateway.

In step S1003, the eNB$_2$ having received the "Handover Request message" transmits a "Handover Request Ack message" to the eNB$_1$ if the eNB$_2$ can accept the UE.

In step S1004, the eNB$_1$ having received the "Handover Request Ack message" transmits a "Handover Command message" instructing the UE about handover, to the UE.

In step S1005, the UE having received the "Handover Command message" transmits a "Handover Confirm message" to the handover target eNB$_2$, when a resource for transmitting an upstream signal is allocated to the UE by the handover target eNB$_2$.

In step S1006, the handover target eNB$_2$ having received the "Handover Confirm message" transmits a "Path Switch message (path switching request)" to the SAE Gateway by using the GTP-U, the "Path Switch message" requesting that a path through which user data is transmitted be switched from the handover source to the handover target.

In step S1007, in parallel, the handover target eNB$_2$ informs of a TE-ID on the handover target eNB$_2$ side and an IP address for the handover target eNB$_2$ through a "Handover Complete message", which is signaling on an S1 interface, in order to establish an SAE Access Bearer, that is, in order to set up a GTP tunnel, between the handover target eNB$_2$ and the SAE Gateway.

In step S1008, after storing therein the TE-ID on the handover target eNB$_2$ side and the IP address for the handover target eNB$_2$, the SAE Gateway transmits a "Handover Complete Ack message" to the handover target eNB$_2$, "Handover Complete Ack message" informing that setting up of the SAE Access Bearer has been completed.

In step S1009, the handover target eNB$_2$ having received the "Handover Complete Ack message" transmits a "Release Resource message" to the handover source eNB$_1$, the "Release Resource message" instructing the handover source eNB$_1$ to release resources having been used for communications with the UE.

Secondly, operations of the eNBs according to this embodiment will be described with reference to FIGS. 7 and 8.

Figure 7:
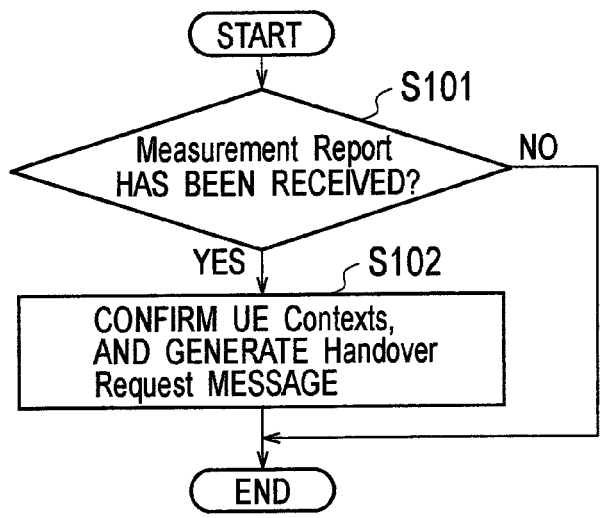
FIG. 7 is a flowchart showing an operation of the eNB according to the first embodiment of the present invention.

As shown in FIG. 7, in step S101, the eNB$_1$ being in communication with the UE confirms whether or not "Measurement Report" has been received.

If "Measurement Report" has not been received, this operation ends.

On the other hand, if "Measurement Report" has been received, in step S102, the eNB$_1$ confirms UE contexts of the UE and transmits a UE context (for example, access bearer setup information such as a TE-ID on the SAE gateway side in a GTP tunnel) on an X2 interface by having this UE context contained in the "Handover Request message", the UE context requiring to be handed over to the handover target eNB$_2$.

Figure 8:
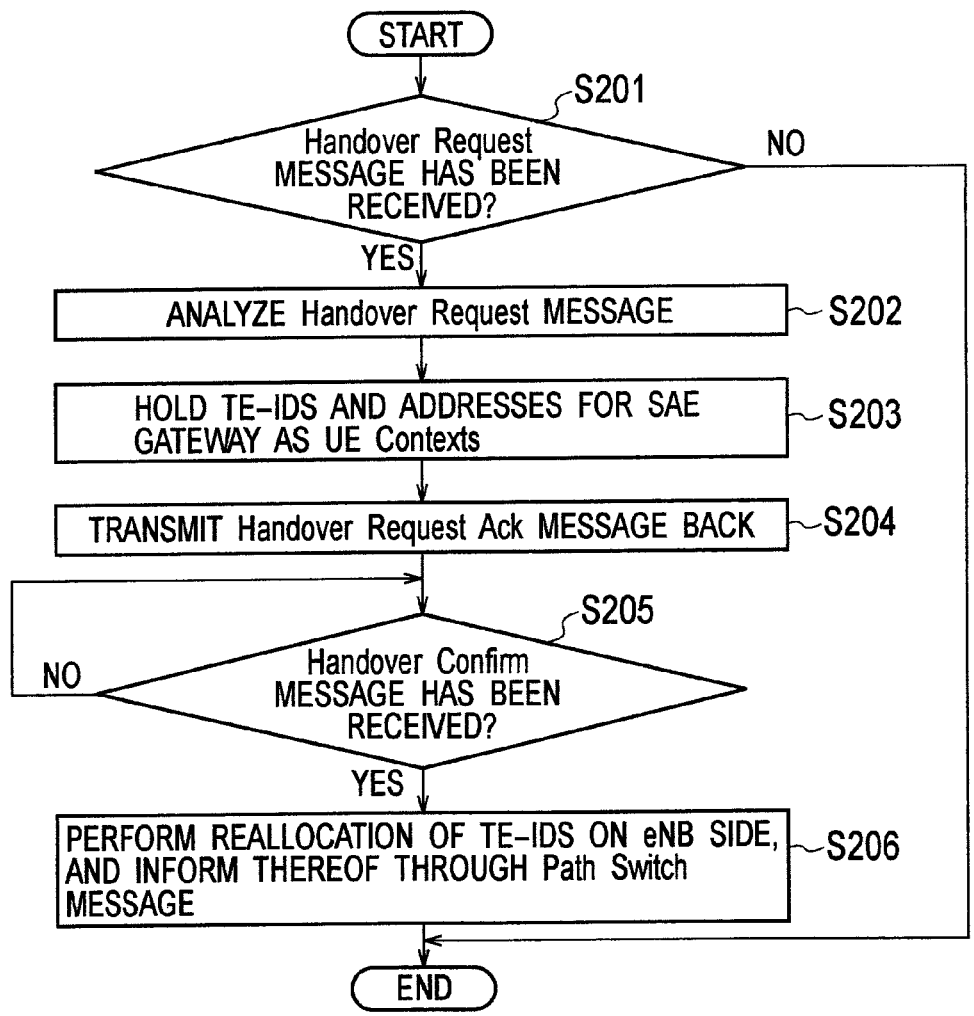
FIG. 8 is a flowchart showing an operation of the eNB according to the first embodiment of the present invention.

Additionally, as shown in FIG. 8, in step S201, the eNB$_2$ not being in communication with the UE confirms whether or not the "Handover Request message" has been received.

If the "Handover Request message" has not been received, this operation ends.

On the other hand, if the "Handover Request message" has been received, the eNB$_2$ analyzes relevant UE contexts of the handover source eNB$_1$ contained in the "Handover Request message".

In step S203, the eNB$_2$ resets, as UE contexts, TE-IDs and addresses on the SAE gateway side with respect to the respective SAE Access Bearers contained in the above relevant UE contexts.

In parallel with step S203, the eNB$_2$ transmits the "Handover Request Ack message" to the handover source eNB$_1$ in step S204.

In step S205, the eNB$_2$ confirms whether or not the "Handover Confirm message" has been received.

If the "Handover Confirm message" has not been received, this operation repeats step S205.

On the other hand, if the "Handover Confirm message" has been received, the eNB$_2$ transmits a "Path Switch message (a path switching request)" to the SAE Gateway through GTP-U.

Thirdly, an operation of the SAE Gateway according to this embodiment will be described with reference to FIG. 9.

As shown in FIG. 9, in step S301, the SAE Gateway confirms whether or not the "Path Switch message (path switching request)" has been received through GTP-U.

If the "Path Switch message (path switching request)" has not been received, this operation ends.

On the other hand, if the "Path Switch message (path switching request)" has been received, the SAE Gateway hands over a UE context from the handover source eNB$_1$ to the handover target eNB$_2$.

(Advantageous Effects of Mobile Communication System According to First Embodiment)

According to the mobile communication system according to the first embodiment, in the handover of the UE, a delay in the handover can be reduced by allowing the handover target eNB$_2$ to use a UE Context held by the handover source eNB$_1$.

While the present invention has been described above in detail by use of the above described embodiment, it is apparent to those skilled in the art that the present invention is not limited by the embodiment described herein. The present invention can be implemented as modified and changed aspects without departing from the spirit and scope of the present invention defined by the appended claims. Accordingly, this description has been given for the purpose of illustrative description, and is not restrictive of the present invention.

Note that entire contents of Japanese Patent Application No. 2007-061090 (filed on Mar. 9, 2007) are incorporated herein by reference.

Industrial Applicability

As has been described above, the mobile communication method, radio base station and upper node according to the present invention are beneficial in radio communications such as mobile communications since, as has been described above, the present invention can provide a mobile communication method, radio base station and upper node which are capable of reducing a delay in the handover by allowing a handover target radio base station eNB to use a UE Context held by a handover source radio base station eNB, in handover.

The invention claimed is:

1. A mobile communication method for performing handover of a mobile station from a radio base station to another radio base station different from the radio base station in a mobile communication system including a plurality of radio base stations and an upper node of the plurality of radio base stations, in which the upper node and a handover source radio base station store setup information on an access bearer having been set up between the upper node and the handover source radio base station, the mobile communication method comprising the steps of
    (A) informing, from the handover source radio base station to a handover target radio base station, the access bearer setup information;
    (B) storing, at the handover target radio base station, the access bearer setup information informed of by the handover source radio base station; and
    (C) setting up, at the upper node, an access bearer between the upper node and the handover target radio base station by using the stored access bearer setup information without performing reallocation processing of new access bearer setup information, the access bearer being set up in response to a path switching request from the handover target radio base station.

2. The mobile communication method according to claim 1, wherein each of the access bearers is a tunnel used for transmitting user data, and the access bearer set up information is a TE-ID of GTP-U on the upper node side in the tunnel.

3. The mobile communication method according to claim 1, wherein, in the step (A), the handover source radio base station informs the handover target radio base station of an IP address for the upper node in addition to the access bearer setup information.

4. The mobile communication method according to claim 1, wherein, in the step (A), the handover source radio base station transmits the access bearer setup information to the handover target radio base station by having the access bearer Setup information contained in a message requesting the handover target radio base station to perform the handover.

5. The mobile communication method according to claim 1, wherein, in the step (B), the handover target radio base station selects access bearer setup information that can be handed over to the handover target radio base station, from the access bearer setup information informed of by the handover source radio base station, and stores the access bearer setup information thus selected.

6. A radio base station used in a mobile communication system in which handover of a mobile station can be performed, the radio base station comprising:
 a handover controller unit configured to transmit a message to a handover target radio base station when a predetermined condition is satisfied with respect to a communication quality in the mobile station, the message requesting the handover target radio base station to perform the handover, wherein
 the handover controller unit is configured to transmit a TE-ID of GTP-U on the upper node side in a tunnel by having the TE-ID contained in the message, the tunnel having been set up between the radio base station and an upper node of the radio base station and being used for transmitting user data.

7. A radio base station used in a mobile communication system in which handover of a mobile station can be performed, the radio base station comprising:
 a handover controller unit configured to set up a tunnel for transmitting user data, between the radio base station and an upper node of the radio base station when having received a message from a handover source radio base station, the message requesting the radio base station to perform the handover, wherein
 the handover controller unit is configured to set up the tunnel between the radio base station and the upper node by using a TE-ID of GTP-U on the upper node side in a tunnel set up between the handover source radio base station and the upper node, the TE-ID being contained in the message.

8. An upper node of a plurality of radio base stations used in a mobile communication system in which handover of a mobile station can be performed, wherein
 the upper node is configured to store setup information on an access bearer having been set up between the upper node and a handover source radio base station, and
 in response to a path switching request from a handover target radio base station, the upper node is configured to set up an access bearer between the upper node and the handover target radio base station by using the stored access bearer setup information, without performing reallocation processing of new access bearer setup information.

* * * * *